US012795269B2

(12) United States Patent
Shibata et al.

(10) Patent No.: US 12,795,269 B2
(45) **Date of Patent: *Nov. 10, 2026**

(54) OPTICAL COMMUNICATION APPARATUS, OPTICAL COMMUNICATION SYSTEM AND TRANSMISSION METHOD

(71) Applicant: NTT, Inc., Tokyo (JP)

(72) Inventors: Naotaka Shibata, Musashino (JP); Shin Kaneko, Musashino (JP)

(73) Assignee: NTT, Inc., Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 18/699,955

(22) PCT Filed: Oct. 12, 2021

(86) PCT No.: PCT/JP2021/037731

§ 371 (c)(1),
(2) Date: Apr. 10, 2024

(87) PCT Pub. No.: WO2023/062716

PCT Pub. Date: Apr. 20, 2023

(65) Prior Publication Data

US 2024/0422457 A1 Dec. 19, 2024

(51) Int. Cl.
*H04Q 11/00* (2006.01)
*H04B 10/27* (2013.01)
*H04J 14/02* (2006.01)

(52) U.S. Cl.
CPC ......... *H04Q 11/0005* (2013.01); *H04B 10/27* (2013.01); *H04J 14/03* (2023.08)

(58) Field of Classification Search
CPC ....... H04Q 11/0005; H04Q 2011/0016; H04Q 2011/0058; H04Q 11/0001; H04B 10/27;
(Continued)

(56) References Cited

U.S. PATENT DOCUMENTS

| | | | |
|---|---|---|---|
| 2010/0124391 | A1 | 5/2010 | Feuer et al. |
| 2012/0020664 | A1 | 1/2012 | Sakurai et al. |

(Continued)

FOREIGN PATENT DOCUMENTS

| | | | |
|---|---|---|---|
| CN | 105900363 | A | 8/2016 |
| JP | 2006-262018 | A | 9/2006 |

(Continued)

OTHER PUBLICATIONS

Jun-ichi Kani et al., "Proposal to start the work to define Open APN Network Model, IOWN Global Forum", Jan. 13, 2022.

(Continued)

*Primary Examiner* — Hibret A Woldekidan
(74) *Attorney, Agent, or Firm* — Harness, Dickey & Pierce, P.L.C.

(57) ABSTRACT

An optical communication device includes: a first optical switch that is connected to a plurality of optical transmission lines and outputs an optical signal input from any of the optical transmission lines to another optical transmission line; a second optical switch that is connected to a plurality of optical transmission lines and outputs an optical signal input from any of the optical transmission lines to another optical transmission line; and a transfer unit configured to transfer an optical signal transmitted from a first device connected to the first optical switch to a specific second device connected to the second optical switch.

12 Claims, 12 Drawing Sheets

(58) Field of Classification Search
CPC ........ H04J 14/03; H04J 14/0212; H04J 14/02; H04J 14/0213; H04J 14/02126
See application file for complete search history.

(56) References Cited

U.S. PATENT DOCUMENTS

| | | | | |
|---|---|---|---|---|
| 2012/0070114 | A1* | 3/2012 | Zhang | H04J 14/0205 385/16 |
| 2012/0262007 | A1* | 10/2012 | Becker | G01R 31/2844 307/113 |
| 2013/0322879 | A1* | 12/2013 | Wachter | H04L 49/1515 370/359 |
| 2014/0270761 | A1 | 9/2014 | Xu et al. | |
| 2015/0098700 | A1 | 4/2015 | Zhu et al. | |
| 2023/0030158 | A1* | 2/2023 | Kanai | H04J 14/0212 |
| 2025/0240098 | A1* | 7/2025 | Shibata | H04B 10/27 |

FOREIGN PATENT DOCUMENTS

| | | | | |
|---|---|---|---|---|
| JP | 2008-092536 | A | 4/2008 | |
| JP | 2010081374 | A | 4/2010 | |
| JP | 2016-527760 | A | 9/2016 | |
| JP | 2017157983 | A * | 9/2017 | H04B 10/27 |
| WO | WO-2014/201965 | A1 | 12/2014 | |
| WO | 2015/107466 | A1 | 7/2015 | |
| WO | WO-2015/107344 | A1 | 7/2015 | |
| WO | WO-2021/131202 | A1 | 7/2021 | |

OTHER PUBLICATIONS

Jun-ichi Kani et al., “Proposed definition and implementation examples of the turnback module in APN-G”, Feb. 2, 2022.

Junichi Kani, “Open APN Network Model”, Feb. 10, 2022.

Masahisa Kawashima, “Turn-Back Use Cases and Support Levels”, Mar. 1, 2022.

“Possible extension of Open ROADM models for end-to-end optical services”, IOWN Global Forum, May 10, 2022.

Junichi Kani, “Open APN Network Model—Preliminary Study to Extend the Open ROADM Models”, Feb. 10, 2022.

Ishii K et al: “Development of Hierarchical Optical Path Cross-Connect Systems Employing Wavelength/Waveband Selective Switches”, Journal of Optical Communications and Networking, IEEE, USA, vol. 3, No. 7, Jul. 1, 2011 (Jul. 1, 2011), pp. 559-567, XP011360007, ISSN: 1943-0620, DOI:10.1364/JOCN.3.000559.

* cited by examiner

OPTICAL COMMUNICATION APPARATUS, OPTICAL COMMUNICATION SYSTEM AND TRANSMISSION METHOD

CROSS-REFERENCE TO RELATED APPLICATIONS

This application is a 371 U.S. National Phase of International Application No. PCT/JP2021/037731, filed Oct. 12, 2021. The entire disclosure of the above application is incorporated herein by reference.

TECHNICAL FIELD

The present invention relates to an optical communication device, an optical communication system, and a transfer method.

BACKGROUND ART

There has been conventionally proposed an optical communication device capable of relaying an optical signal in accordance with a destination while reducing a delay (see, for example, Patent Literature 1). FIG. 12 illustrates a configuration example of an optical communication system 100 including a conventional optical communication device. The optical communication system 100 includes an optical SW 110 and a control unit 115 forming the optical communication device. The optical SW 110 is connected to subscriber devices 140-1 to 140-3.

The optical SW 110 is connected to a plurality of optical transmission lines and outputs an optical signal input from any of the optical transmission lines to another optical transmission line. The optical SW 110 of FIG. 12 includes first ports 111-1 to 111-6 and second ports 112-1 to 112-6. Each of the first ports 111 is connected to any of the subscriber devices 140-1 to 140-3 via any of optical transmission lines 135-1 to 135-3. Each of the second ports 112 is connected to optical transmission lines 136-1 to 136-4 or a return transmission line 137.

The return transmission line 137 is an optical transmission line for inputting an optical signal output from a certain port to another port. For example, in the example of FIG. 12, the return transmission line 137 is connected to the second port 112-4 and the second port 112-5. Therefore, for example, an optical signal output from the second port 112-4 can be input to the second port 112-5.

The control unit 115 is connected to the second port 112-6 of the optical SW 110 via the optical transmission line 136-4. The control unit 115 includes a wavelength management control unit 120 and an optical SW control unit 130. The wavelength management control unit 120 allocates a wavelength to the subscriber devices 140. The optical SW control unit 130 switches a path in the optical SW 110. In the example of FIG. 12, the optical SW control unit 130 switches the path in the optical SW 110 so as to connect the first port 111-2 to which the subscriber device 140-1 is connected and the second port 112-2, connect the first port 111-4 to which the subscriber device 140-2 is connected and the second port 112-4, and connect the first port 111-5 to which the subscriber device 140-3 is connected and the second port 112-5.

Therefore, an optical signal transmitted from the subscriber device 140-1 is input to the first port 111-2 of the optical SW 110 via the optical transmission line 135-1 and is output from the second port 112-2 of the optical SW 110 to the optical transmission line 136-2. An optical signal transmitted from the subscriber device 140-2 is input to the first port 111-4 of the optical SW 110 via the optical transmission line 135-2 and is output from the second port 112-4 of the optical SW 110 to the return transmission line 137. The optical signal output to the return transmission line 137 is input to the second port 112-5 of the optical SW 110 and is output from the first port 111-5 of the optical SW 110 to the optical transmission line 135-3. The optical signal output to the optical transmission line 135-3 is transmitted to the subscriber device 140-3.

As described above, low delay communication can be implemented by using the return transmission line 137 for the ports (e.g. the second ports 112) different from the ports (e.g. the first ports 111) to which the subscriber devices 140 are connected.

CITATION LIST

Patent Literature

Patent Literature 1: WO 2021/131202 A

SUMMARY OF INVENTION

Technical Problem

In the optical communication system 100 of FIG. 12, it is possible to increase the maximum number of users transmittable to each path by using a plurality of optical SWs 110-1 to 110-P (P is an integer of 2 or more) arranged in parallel in one base. FIG. 13 is an explanatory diagram of a configuration in which the plurality of optical SWs 110 is arranged in parallel. In the example of FIG. 13, the optical SWs 110-1 to 110-P are arranged in parallel, and each optical SW 110 is connected to the subscriber device 140.

In order to perform return communication between the subscriber device 140-1 connected to the optical SW 110-1 and the subscriber device 140-2 connected to the optical SW 110-2, it is necessary to connect the second port 112-1 of the optical SW 110-1 and the second port 112-1 of the optical SW 110-2 via the return transmission line 137. In a case where P optical SWs 110 are provided and each optical SW 110 houses n (n is an integer of 1 or more) subscriber devices 140, it is necessary to connect the return transmission lines 137 to one optical SW 110 by using $n\times(p-1)$ ports in order to connect each subscriber device 140 to an arbitrary subscriber device 140 at an arbitrary timing.

Each optical SW 110 requires n lines to communicate with the arbitrary subscriber device 140, and thus np ports are required in total between the SWs and in the SWs. It is conceivable to reduce the number of the return transmission lines 137 and physically change wiring every time when a connection request is received. However, this is not desirable because local operation increases. Therefore, there is a demand for a technique of eliminating the need for physical wiring and connecting each subscriber device to an arbitrary subscriber device at an arbitrary timing by using the number of return transmission lines smaller than before.

In view of the above circumstances, an object of the present invention is to provide a technique capable of connecting each subscriber device to an arbitrary subscriber device at an arbitrary timing by using the number of return transmission lines smaller than before in a case where an optical communication system including a plurality of optical switches performs return communication.

Solution to Problem

One aspect of the present invention is an optical communication device including: a first optical switch that is connected to a plurality of optical transmission lines and outputs an optical signal input from any of the optical transmission lines to another optical transmission line; a second optical switch that is connected to a plurality of optical transmission lines and outputs an optical signal input from any of the optical transmission lines to another optical transmission line; and a transfer unit configured to transfer an optical signal transmitted from a first device connected to the first optical switch to a specific second device connected to the second optical switch.

One aspect of the present invention is an optical communication system including: a first optical switch that is connected to a plurality of optical transmission lines and outputs an optical signal input from any of the optical transmission lines to another optical transmission line; a second optical switch that is connected to a plurality of optical transmission lines and outputs an optical signal input from any of the optical transmission lines to another optical transmission line; and a transfer unit configured to transfer an optical signal transmitted from a first device connected to the first optical switch to a specific second device connected to the second optical switch.

One aspect of the present invention is a transfer method including: causing a first optical switch connected to a plurality of optical transmission lines to output an optical signal input from any of the optical transmission lines to another optical transmission line; causing a second optical switch connected to a plurality of optical transmission lines to output an optical signal input from any of the optical transmission lines to another optical transmission line; and transferring an optical signal transmitted from a first device connected to the first optical switch to a specific second device connected to the second optical switch.

Advantageous Effects of Invention

The present invention can connect each subscriber device to an arbitrary subscriber device at an arbitrary timing by using the number of return transmission lines smaller than before in a case where an optical communication system including a plurality of optical switches performs return communication.

DESCRIPTION OF EMBODIMENTS

Hereinafter, embodiments of the present invention will be described with reference to drawings.

First Embodiment

Figure 1:
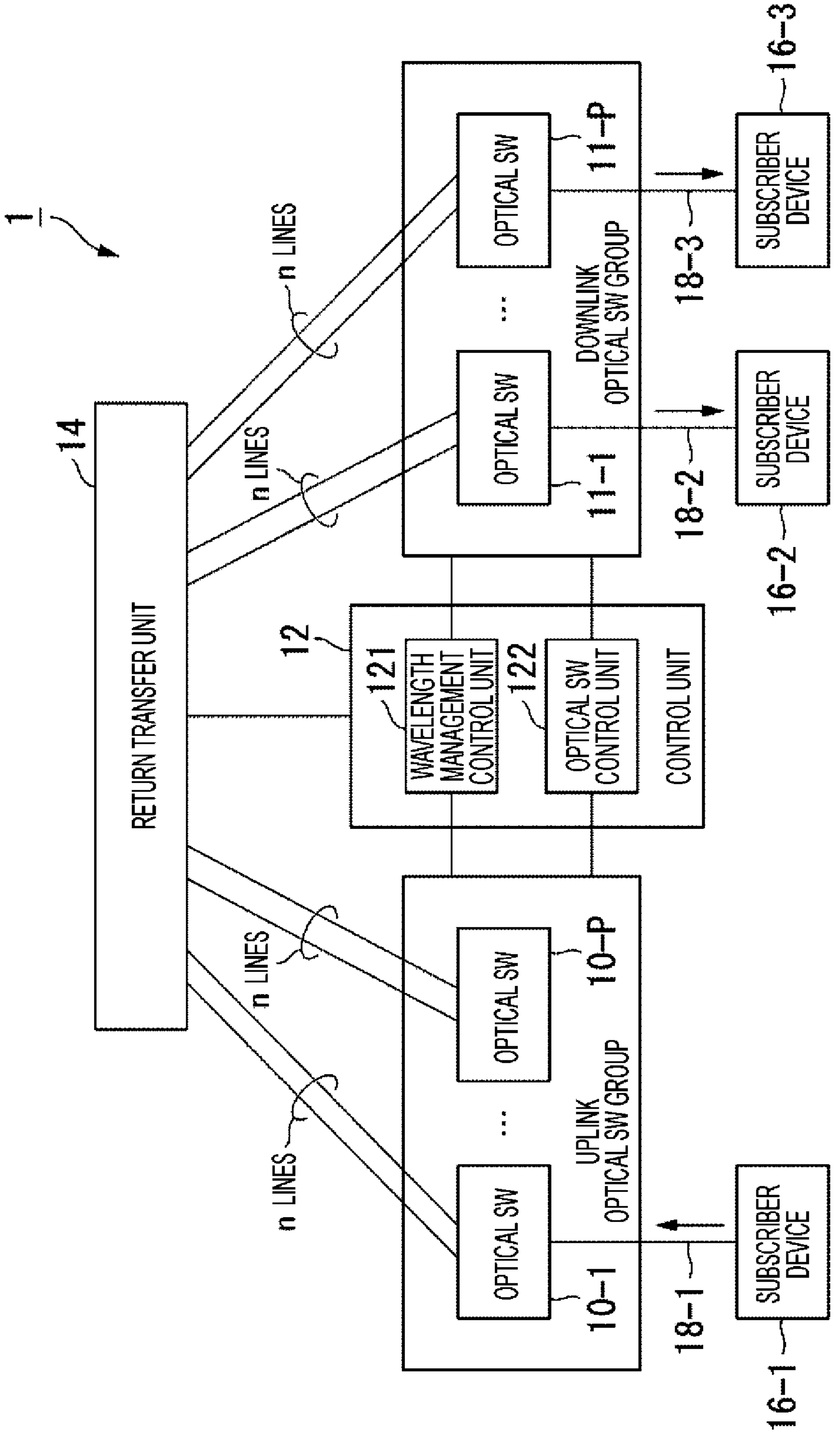
FIG. 1 is a configuration diagram of an optical communication system according to a first embodiment.

FIG. 1 is a configuration diagram of an optical communication system 1 according to a first embodiment. The optical communication system 1 includes P optical SWs 10-1 to 10-P (P is an integer of 2 or more), P optical SWs 11-1 to 11-P, a control unit 12, and a return transfer unit (transferer) 14. Hereinafter, description will be made on the assumption that the optical SWs 10-1 to 10-P are used for transmitting optical signals in an uplink direction and that the optical SWs 11-1 to 11-P are used for transmitting optical signals in a downlink direction. In the following description, the optical SWs 10-1 to 10-P will be simply referred to as the optical SWs 10 when not distinguished, and the optical SWs 11-1 to 11-P will be simply referred to as the optical SWs 11 when not distinguished. The optical SWs 10, the optical SWs 11, the control unit 12, and the return transfer unit 14 are functional units forming one optical communication device.

The optical SW 10 is connected to a plurality of optical transmission lines and outputs an optical signal input from any of the optical transmission lines to another optical transmission line. The optical transmission lines are, for example, optical fibers. The optical SW 10 includes a plurality of first ports (e.g. n first ports) and a plurality of second ports (e.g. n or more second ports). Each first port of the optical SW 10 is connected to a subscriber device 16 via a transmission line 18. FIG. 1 illustrates an example where a subscriber device 16-1 is connected to the optical SW 10-1 via an optical transmission line 18-1. The optical SW 10 is one aspect of a first optical switch.

Among the plurality of second ports of the optical SW 10, n second ports are connected to the return transfer unit 14 via n optical transmission lines. Remaining second ports of the plurality of second ports of the optical SW 10 may be connected to another device via optical transmission lines. In the following description, the number of first ports and the number of second ports in the optical SW 10 are assumed to be n for simplicity of description.

The optical SW 11 is connected to a plurality of optical transmission lines and outputs an optical signal input from any of the optical transmission lines to another optical transmission line. The optical SW 11 includes a plurality of first ports (e.g. n first ports) and a plurality of second ports (e.g. n or more second ports). Each first port of the optical SW 11 is connected to the subscriber device 16 via the transmission line 18. FIG. 1 illustrates an example where a subscriber device 16-2 is connected to the optical SW 11-1 via an optical transmission line 18-2, and a subscriber device 16-3 is connected to the optical SW 11-P via an optical transmission line 18-3. The optical SW 11 is one aspect of a second optical switch.

Among the plurality of second ports of the optical SW 11, n second ports are connected to the return transfer unit 14 via n optical transmission lines. Remaining second ports of the plurality of second ports of the optical SW 11 may be connected to another device via optical transmission lines. In the following description, the number of first ports and the number of second ports in the optical SW 11 are assumed to be n for simplicity of description.

The subscriber device 16 is connected to the optical SW 10 or 11 via an optical access network such as a passive optical network (PON). The subscriber device 16 includes an optical transceiver. The optical transceiver is an example of an optical transmission unit and an optical reception unit in the subscriber device 16. The optical transceiver is a wavelength-tunable optical transmitter/receiver. In this case, the subscriber device 16 can perform communication at an arbitrary wavelength. The optical transceiver may be an optical transceiver having an auxiliary management and control channel (AMCC) function. In this case, a wavelength used in the subscriber device 16 is controlled via a control signal superimposed by the AMCC. The subscriber device 16 is one aspect of a first device and a second device.

The control unit 12 is connected to the second port of each of the optical SWs 10 and 11 via an optical transmission line. The control unit 12 includes a wavelength management control unit 121 and an optical SW control unit 122. The wavelength management control unit 121 allocates a wavelength to each subscriber device 16. In a case where the wavelength management control unit 121 allocates a wavelength to each subscriber device 16, the optical SW control unit 122 switches a path between the ports of the optical SW 10 or 11 so as to connect the subscriber device 16 and the wavelength management control unit 121.

The optical SW control unit 122 switches connection between the ports of the optical SW 10 and connection between the ports of the optical SW 11. For example, the optical SW control unit 122 switches the connection between the ports of each of the optical SWs 10 and 11 such that the subscriber device 16 can communicate with a desired subscriber device 16.

The control unit 12 stores a management table. The management table includes information for identifying the subscriber devices 16, information regarding a wavelength allocated to each subscriber device 16, and information regarding the optical SW 10 or 11 to which the subscriber device 16 is connected (e.g. information regarding a port to which the subscriber device 16 is connected). The control unit 12 includes one or more processors.

The return transfer unit 14 receives an optical signal output from the optical SW 10 as an input and transfers the input optical signal to at least the optical SW 11 to which a destination subscriber device 16 is connected. The n optical transmission lines are connected from one optical SW 10 to the return transfer unit 14, and thus nP uplink optical transmission lines are connected to the return transfer unit 14. The n optical transmission lines are connected from one optical SW 11 to the return transfer unit 14, and thus nP downlink optical transmission lines are connected to the return transfer unit 14. The return transfer unit 14 is one aspect of a transfer unit.

In a case where return communication is performed across the optical SW 10, the optical SW control unit 122 switches a path between the ports of the optical SW 10 so as to connect an output destination of an optical signal from the optical SW 10 to the return transfer unit 14. The return transfer unit 14 performs control such that the input optical signal is output to a desired optical SW 11. With this configuration, return communication between arbitrary optical SWs is implemented while the number of wires required for return in each optical SW is suppressed to n.

In a case where the return transfer unit 14 is implemented by one device, for example, a wavelength selective switch (WSS), fiber cross connect (FXC), or cyclic arrayed waveguide gratings (AWG) having nP×nP ports is used. However, in a case where nP is large, it is difficult to implement the WSS and fiber cross connect having nP×nP ports, which also leads to an increase in price. Therefore, hereinafter, a case where the return transfer unit 14 includes a plurality of devices will also be described.

Figure 2:
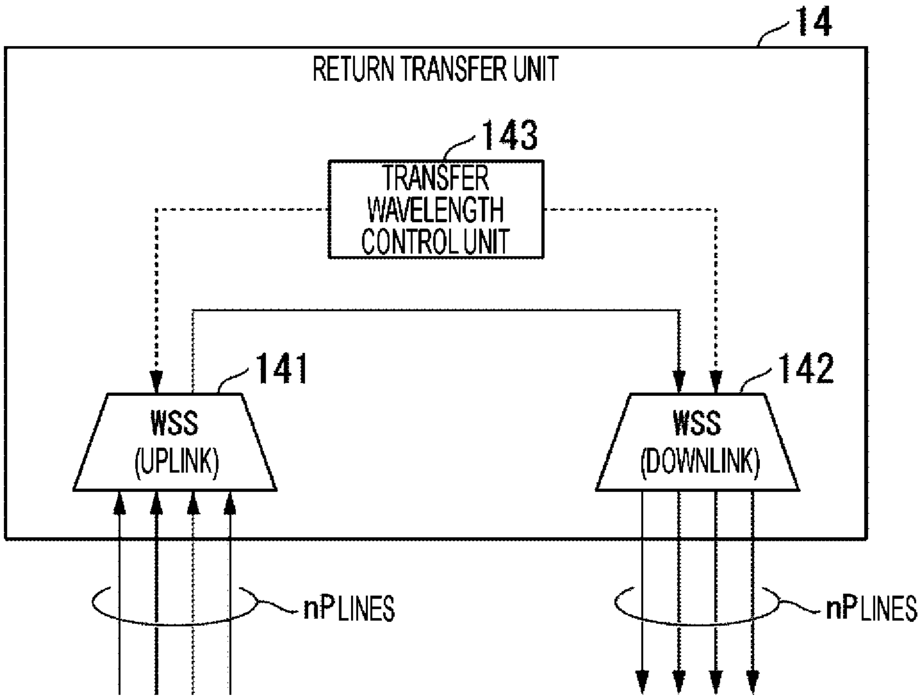
FIG. 2 is a block diagram illustrating a specific example of a (first) functional configuration of a return transfer unit according to the first embodiment.

FIG. 2 is a block diagram illustrating a specific example of a (first) functional configuration of the return transfer unit 14 according to the first embodiment.

The return transfer unit 14 includes a WSS 141, a WSS 142, and a transfer wavelength control unit (transfer wavelength controller) 143. The WSS 141 is connected to the n optical transmission lines connected to the second ports of each optical SW 10 (nP optical transmission lines in total) and outputs, to the WSS 142, an optical signal having a wavelength set by the transfer wavelength control unit 143 (hereinafter, referred to as a "set wavelength") among optical signals transmitted via a certain optical transmission line. The WSS 141 is a wavelength selective optical switch. The number of ports required for the WSS 141 is n×P. The WSS 141 is one aspect of a first multiplexing/demultiplexing unit (one or more first multiplexing/demultiplexing devices).

The WSS 142 is connected to the n optical transmission lines connected to the second ports of each optical SW 11 (nP optical transmission lines in total) and outputs the optical signal having the set wavelength output from the WSS 141 to an optical transmission line serving as an output path of the set wavelength. The WSS 142 is a wavelength selective optical switch. The number of ports required for the WSS 142 is n×P. The WSS 142 is one aspect of a second multiplexing/demultiplexing unit (one or more second multiplexing/demultiplexing devices).

The transfer wavelength control unit 143 sets a wavelength to be output by the WSSs 141 and 142 in response to an instruction from the control unit 12. Specifically, in a case where the transfer wavelength control unit 143 receives, from the control unit 12, an instruction on a wavelength to be transferred at the time of return communication, the transfer wavelength control unit 143 sets a designated wavelength to the WSSs 141 and 142. Therefore, the WSSs 141 and 142 can output an optical signal having the set wavelength. The transfer wavelength control unit 143 may be mounted on the control unit 12.

Figure 3:
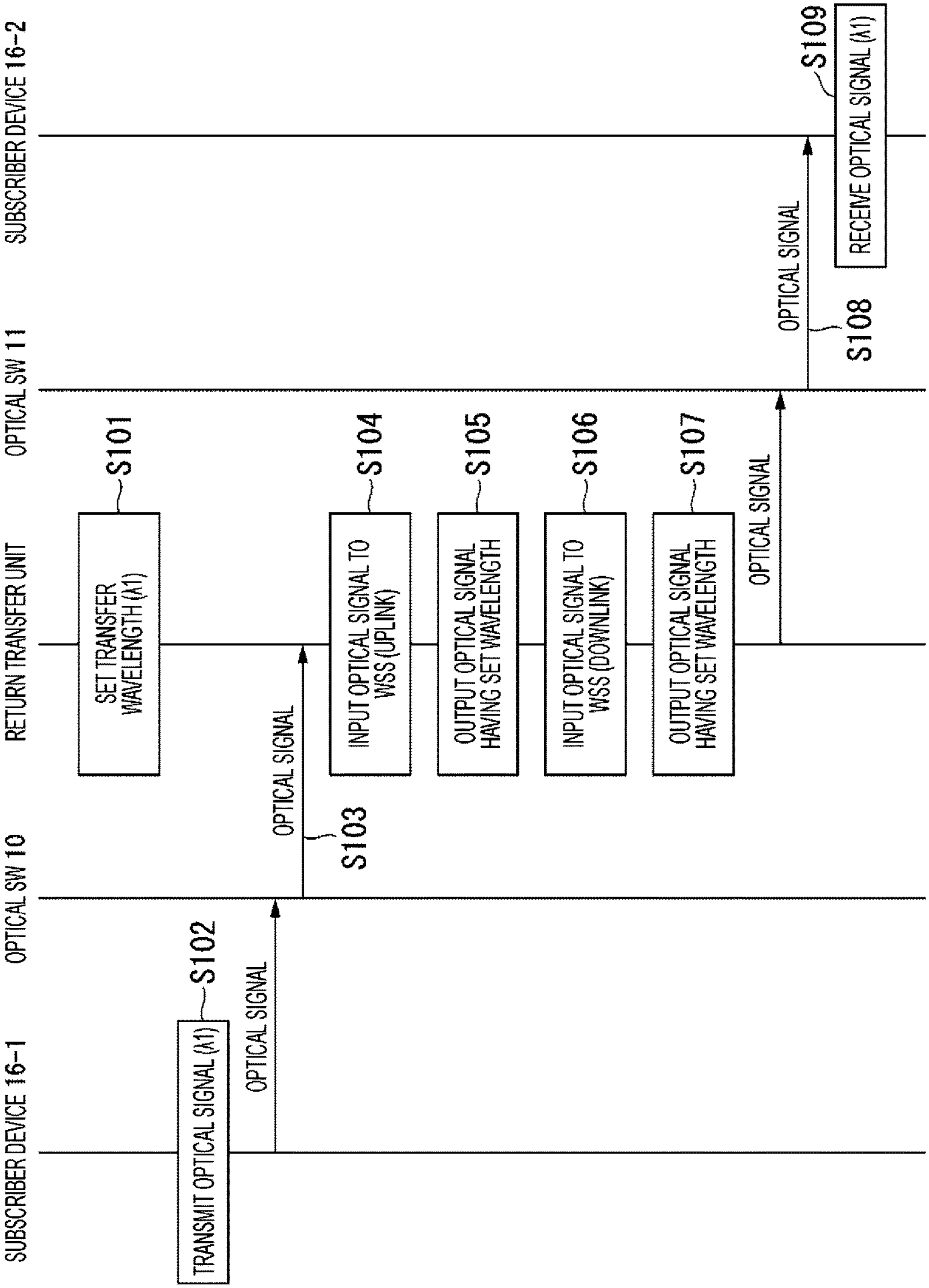
FIG. 3 is a sequence diagram showing a flow of processing of the optical communication system according to the first embodiment.

FIG. 3 is a sequence diagram showing a flow of processing of the optical communication system 1 according to the first embodiment. FIG. 3 shows a case where the subscriber device 16-1 connected to the optical SW 10-1 and the subscriber device 16-2 connected to the optical SW 11-1 in FIG. 1 perform communication. Here, a wavelength λ1 is assumed to be allocated to the subscriber device 16-1 and the subscriber device 16-2.

The transfer wavelength control unit 143 performs setting so as to transfer the wavelength λ1 between the ports used between the WSS 141 and the optical SW 10-1 and between the ports used between the WSS 142 and the optical SW 11-1 (step S101). The subscriber device 16-1 transmits an optical signal having the wavelength 21 (step S102). The optical signal having the wavelength λ1 transmitted from the subscriber device 16-1 is input to the first port of the optical SW 10-1 via the optical transmission line 18-1.

The optical SW 10-1 is controlled by the optical SW control unit 122 so as to connect a path between the first port of the optical SW 10-1 to which the subscriber device 16-1 is connected and the second port of the optical SW 10-1 to which the return transfer unit 14 is connected. Therefore, the optical signal having the wavelength λ1 input to the first port of the optical SW 10-1 is output from the second port to the return transfer unit 14 (step S103).

The optical signal having the wavelength λ1 output from the optical SW 10-1 is input to the WSS 141 (step S104). The WSS 141 outputs the optical signal having the set wavelength set by the transfer wavelength control unit 143 to the WSS 142 (step S105). Here, because the wavelength λ1 is set as the set wavelength, the optical signal having the wavelength λ1 is output from the WSS 141. The optical signal having the wavelength λ1 output from the WSS 141 is input to the WSS 142 (step S106).

The WSS 142 outputs the optical signal having the set wavelength set by the transfer wavelength control unit 143 to the optical transmission line to which the optical SW 11-1 is connected (step S107). Here, because the wavelength λ1 is set as the set wavelength, the optical signal having the wavelength λ1 is output from the WSS 142. The optical signal having the wavelength λ1 output from the WSS 142 is input to the second port of the optical SW 11-1 via the optical transmission line.

The optical SW 11-1 is controlled by the optical SW control unit 122 so as to connect a path between the first port of the optical SW 11-1 to which the subscriber device 16-2 is connected and the second port of the optical SW 11-1 to which the return transfer unit 14 is connected. Therefore, the optical signal having the wavelength λ1 input to the second port of the optical SW 11-1 is output from the first port to the subscriber device 16-2 via the optical transmission line 18-2 (step S108). The subscriber device 16-2 receives the optical signal having the wavelength λ1 output from the optical SW 11-1 (step S109).

In a case where one or more return communications have already been performed and another return communication is newly performed, the same wavelength cannot be used between the WSS 141 and the WSS 142. Therefore, in a case where a wavelength to be used in the new return communication is the same wavelength, the transfer wavelength control unit 143 outputs a wavelength change command to the wavelength management control unit 121. The wavelength change command is an instruction for changing the wavelength to be used by the subscriber device 16. In response to the wavelength change command, the wavelength management control unit 121 notifies a target subscriber device 16 to perform communication with a wavelength (e.g. 22) different from the wavelength already used for the return communication in the subscriber device 16. Therefore, even in a case where a return communication is newly performed, return communication can be performed by using different wavelengths.

According to the optical communication system 1 configured as described above, in a case where return communication is performed in the optical communication system 1 including the plurality of optical SWs 10 and 11, the number of wires required for return in each optical SW can be suppressed to n. Therefore, each subscriber device can be connected to an arbitrary subscriber device at an arbitrary timing by using the number of return transmission lines smaller than before.

Modification Example of First Embodiment

An amplifier may be provided between the WSS 141 and the WSS 142.

Figure 4:
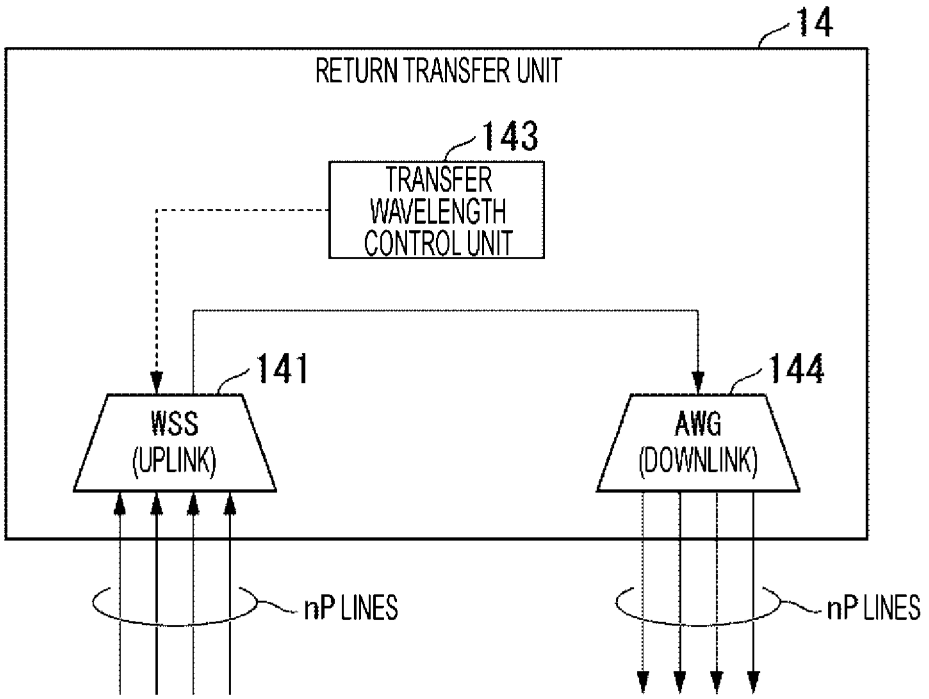
FIG. 4 is a block diagram illustrating a specific example of a (second) functional configuration of the return transfer unit according to the first embodiment.
Figure 5:
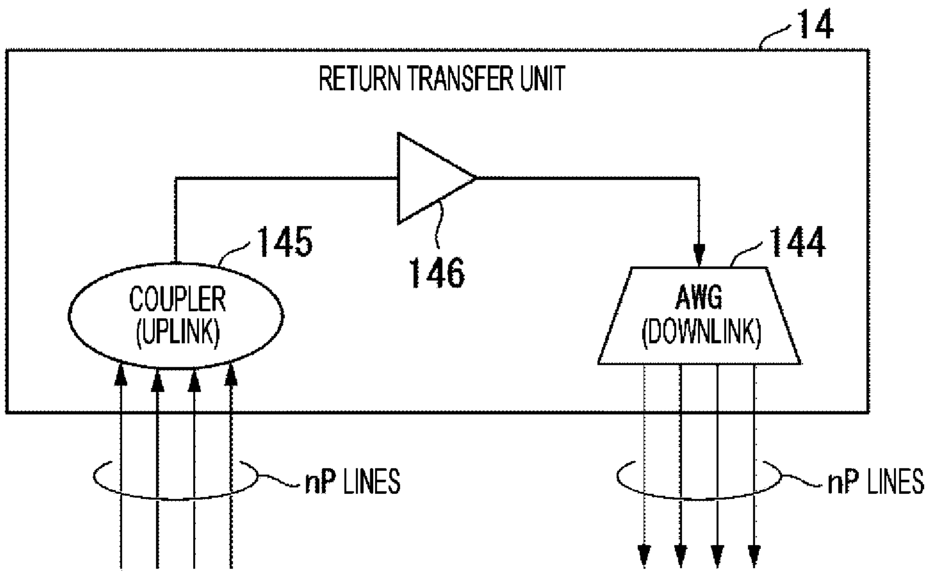
FIG. 5 is a block diagram illustrating a specific example of a (third) functional configuration of the return transfer unit according to the first embodiment.

The return transfer unit 14 may have a configuration of FIG. 4 or 5.

FIG. 4 is a block diagram illustrating a specific example of a (second) functional configuration of the return transfer unit 14 according to the first embodiment. The return transfer unit 14 includes the WSS 141, the transfer wavelength control unit 143, and an AWG 144. The configuration of FIG. 4 is different from the configuration of FIG. 2 in that a target to be controlled by the transfer wavelength control unit 143 is the WSS 141 and that the AWG 144 is newly provided instead of the WSS 142.

In the configuration of FIG. 4, the transfer wavelength control unit 143 sets an output wavelength only to the WSS 141. The AWG 144 is connected to the n optical transmission lines connected to the second ports of each optical SW 11 (nP optical transmission lines in total) and outputs an optical signal output from the WSS 141 via a path corresponding to the wavelength. Here, the AWG is lower in cost than the WSS, but an output port and a wavelength that can be output from the port are fixed. Therefore, it is necessary to control the wavelength in accordance with the other party of the return communication. The AWG 144 is one aspect of the second multiplexing/demultiplexing unit.

For example, in a case where the subscriber device 16-1 connected to the optical SW 10-1 and the subscriber device 16-2 connected to the optical SW 11-1 perform return communication, a wavelength that can be transferred between ports used between the AWG 144 and the optical SW 11-1 is determined. The wavelength management control unit 121 sets a transmission wavelength of the subscriber device 16-1 to the wavelength that can be transferred between the ports used between the AWG 144 and the optical SW 11-1. Further, the transfer wavelength control unit 143 sets the WSS 141 such that the wavelength that can be transferred between the ports used between the AWG 144 and the optical SW 11-1 can be transferred between ports used between the WSS 141 and the optical SW 10-1. This makes it possible to implement return communication.

The AWG 144 may be newly provided instead of the WSS 141 in the configuration of FIG. 2. The transfer wavelength control unit 143 may set an output wavelength only to the WSS 142. In this case, the AWG 144 is connected to the n optical transmission lines connected to the second ports of each optical SW 10 (nP optical transmission lines in total) and inputs an optical signal output from each optical SW 10 via a path corresponding to the wavelength. For example, in a case where the subscriber device 16-1 connected to the optical SW 10-1 and the subscriber device 16-2 connected to the optical SW 11-1 perform return communication, a wavelength that can be transferred between ports used between the AWG 144 and the optical SW 10-1 is determined. The wavelength management control unit 121 sets a transmission wavelength of the subscriber device 16-1 to the wavelength that can be transferred between the ports used between the AWG 144 and the optical SW 10-1. Further, the transfer wavelength control unit 143 sets the WSS 142 such that the wavelength that can be transferred between the ports used between the AWG 144 and the optical SW 10-1 can be transferred between ports used between the WSS 142 and the optical SW 11-1. This makes it possible to implement return communication. An amplifier may be provided between the WSS 141 and the AWG 144.

Next, another example will be described with reference to FIG. 5. FIG. 5 is a block diagram illustrating a specific example of a (third) functional configuration of the return transfer unit 14 according to the first embodiment. The return transfer unit 14 includes the AWG 144, a coupler 145, and an amplifier 146. The coupler 145 is connected to the n optical transmission lines connected to the second ports of each optical SW 10 (nP optical transmission lines in total) and receives an optical signal transmitted via any of the nP optical transmission lines as an input. The coupler 145 multiplexes the input optical signals and outputs the multiplexed optical signal. The coupler 145 is one aspect of the first multiplexing/demultiplexing unit.

The amplifier 146 amplifies the optical signal output from the coupler 145. The AWG 144 is connected to the n optical transmission lines connected to the second ports of each optical SW 11 (nP optical transmission lines in total), demultiplexes the optical signal amplified by the amplifier 146, and outputs the demultiplexed optical signals to the optical transmission lines. The coupler is lower in cost than the WSS and does not need to be controlled by the transfer wavelength control unit 143. In a case where a branching loss is relatively small, the amplifier 146 may not be provided.

Second Embodiment

A second embodiment is similar to the first embodiment in the system configuration of the optical communication system 1, except for the configuration of the return transfer unit 14. Therefore, hereinafter, differences from the first embodiment will be described.

Figure 6:
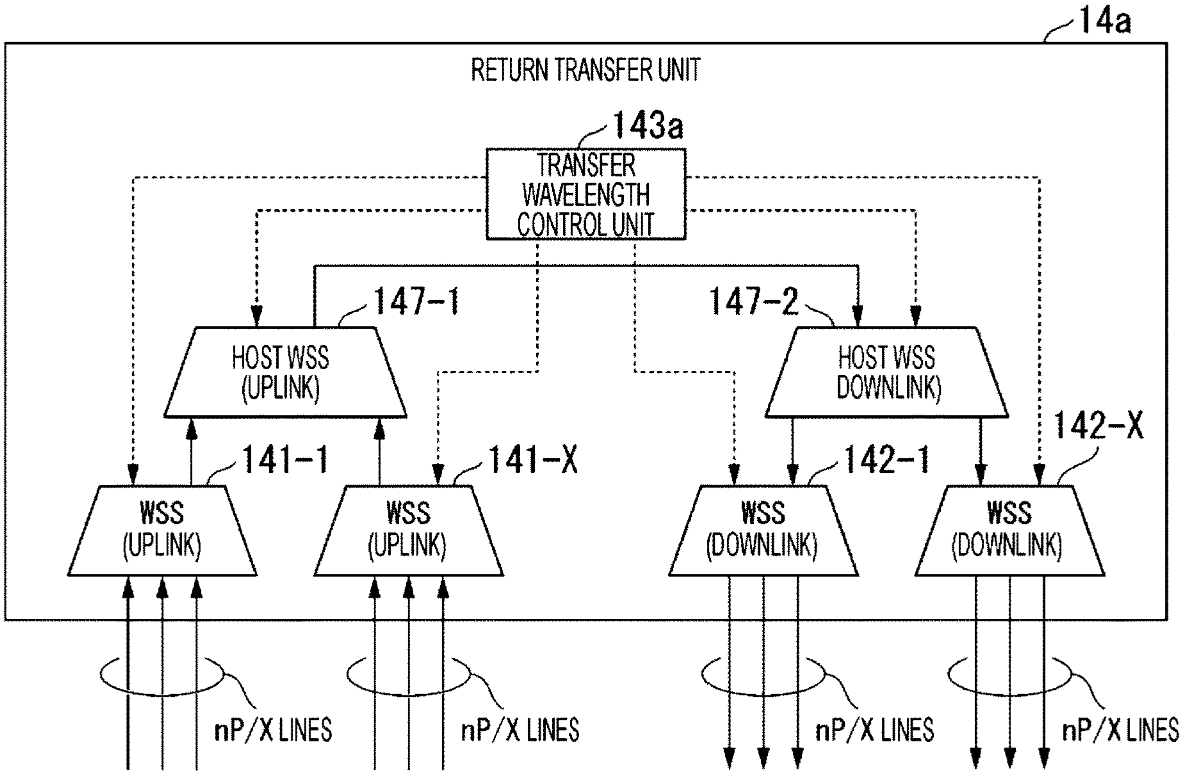
FIG. 6 is a block diagram illustrating a specific example of a (first) functional configuration of a return transfer unit according to a second embodiment.

FIG. 6 is a block diagram illustrating a specific example of a (first) functional configuration of a return transfer unit 14*a* according to the second embodiment.

The return transfer unit 14*a* includes a plurality of WSSs 141-1 to 141-X (X is an integer of 2 or more), a plurality of WSSs 142-1 to 142-X, a transfer wavelength control unit 143*a*, and a plurality of host WSSs 147-1 and 147-2. In the example of FIG. 6, a WSS 141-*x* ($1 \le x \le X$) is connected to the host WSS 147-1, and a WSS 142-*x* is connected to the host WSS 147-2.

The WSS 141-*x* is connected to different nP/X optical transmission lines among the n optical transmission lines connected to the second ports of each optical SW 10 (nP optical transmission lines in total) and outputs, to the host WSS 147, an optical signal having a set wavelength among optical signals transmitted via a certain optical transmission line. In this manner, substantially the same number of optical transmission lines is connected to each WSS 141 on average. For example, in a case where the number of WSSs 141 is two (X=2), the number of optical SWs 10 is three (P=3), and the number of optical transmission lines connected to the second ports of each optical SW 10 is two (n=2), three different optical transmission lines are connected to each WSS 141. The number of ports required for the WSS 141 is n×P/X.

The WSS 142-*x* is connected to different nP/X optical transmission lines and outputs an optical signal having the set wavelength output from the host WSS 147-2 to an optical transmission line serving as an output path of the set wavelength. In this manner, substantially the same number of optical transmission lines is connected to each WSS 142 on average. The number of ports required for the WSS 142 is n×P/X.

The host WSS 147-1 outputs, to the host WSS 147-2, an optical signal having the set wavelength among optical signals output from each WSS 141. The number of ports required for the host WSS 147-1 is X.

The host WSS 147-2 outputs, to each WSS 142, an optical signal having the set wavelength among optical signals output from the host WSS 147-1. The number of ports required for the host WSS 147-2 is X.

The transfer wavelength control unit 143*a* sets a wavelength to be output by the WSSs 141 and 142 and the host WSSs 147 in response to an instruction from the control unit 12. The transfer wavelength control unit 143*a* may be mounted on the control unit 12.

According to the optical communication system 1 of the second embodiment configured as described above, the X WSSs 141 and X WSSs 142 are arranged in parallel, and the host WSS 147 is arranged on the host side of each of the WSSs 141 and 142 arranged in parallel. With such a configuration, the required number of ports per WSS can be reduced, as compared with the first embodiment.

Modification Example of Second Embodiment

The amplifier may be provided between any or all of the WSS 141-*x* and the host WSS 147-1, the host WSS 147-1 and the host WSS 147-2, and the WSS 142-*x* and the host WSS 147-2.

Figure 7:
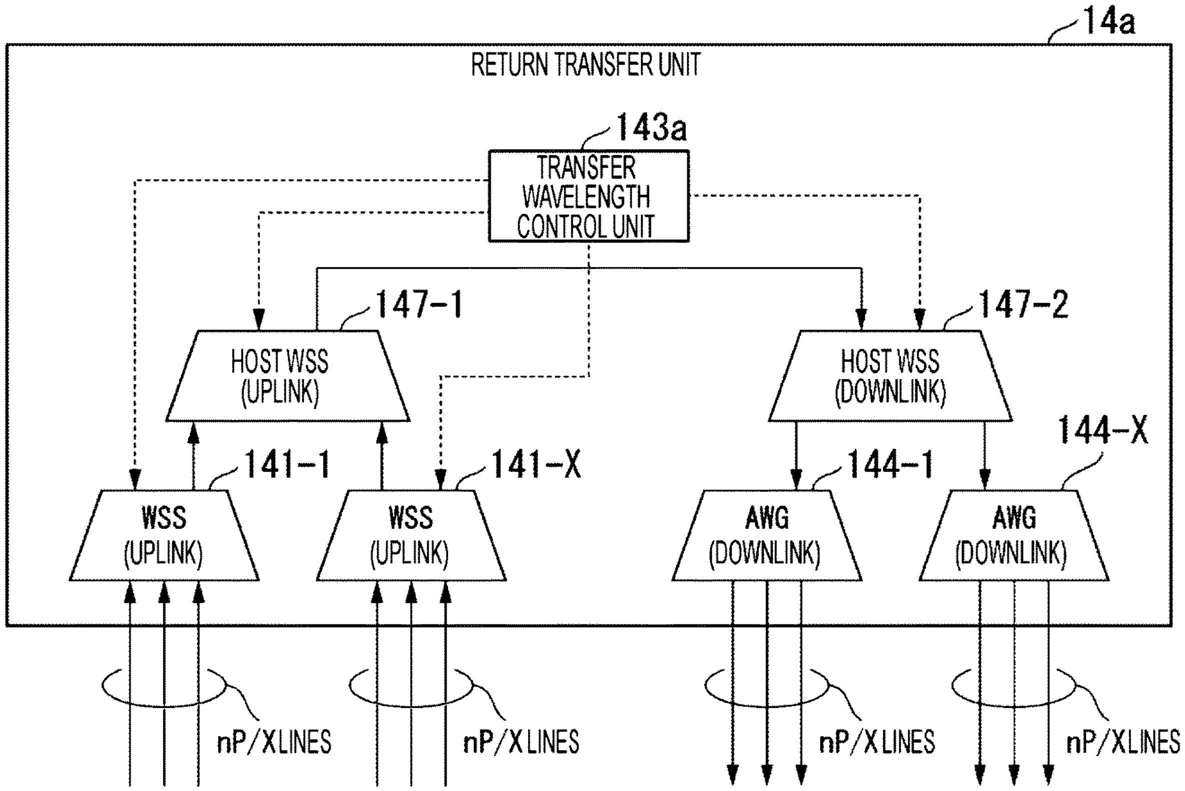
FIG. 7 is a block diagram illustrating a specific example of a (second) functional configuration of the return transfer unit according to the second embodiment.
Figure 8:
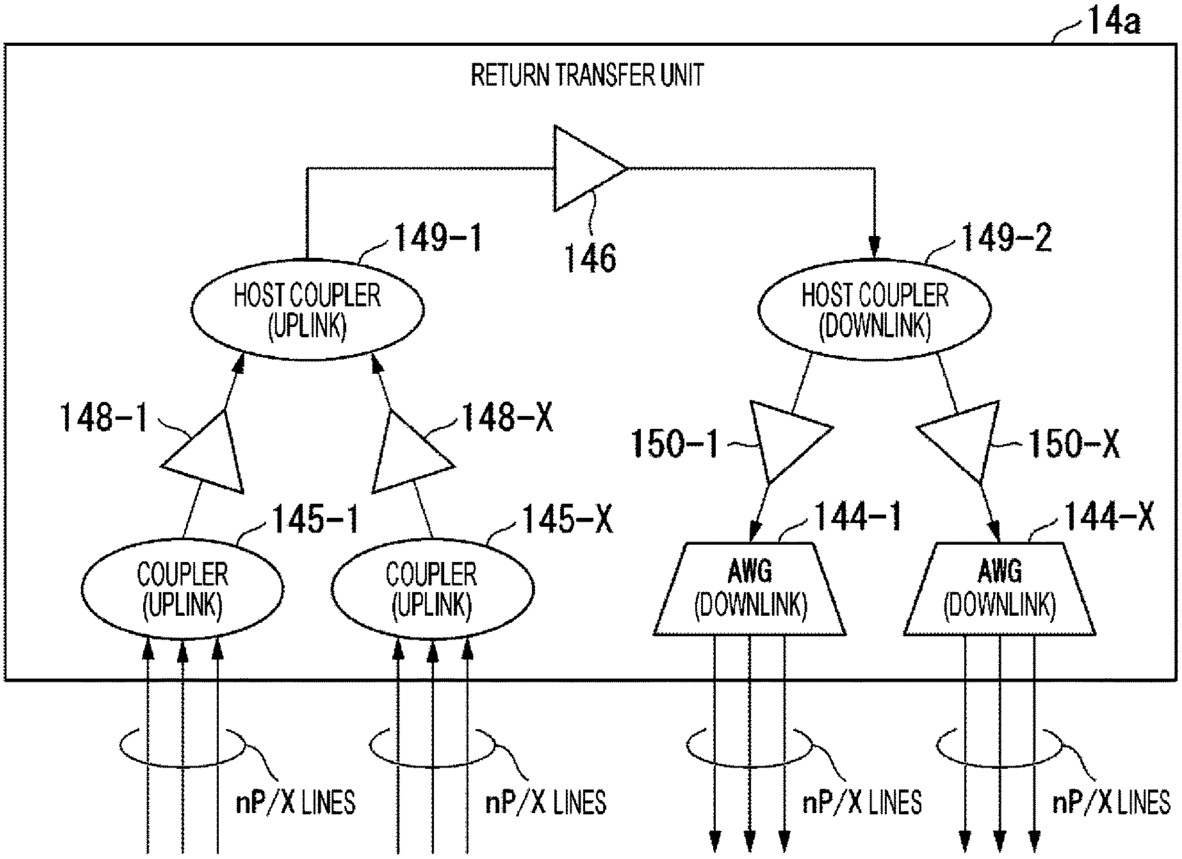
FIG. 8 is a block diagram illustrating a specific example of a (third) functional configuration of the return transfer unit according to the second embodiment.

The return transfer unit 14*a* may have a configuration of FIG. 7 or 8.

FIG. 7 is a block diagram illustrating a specific example of a (second) functional configuration of the return transfer unit 14*a* according to the second embodiment.

The return transfer unit 14*a* includes the plurality of WSSs 141-1 to 141-X, the transfer wavelength control unit 143*a*, a plurality of AWGs 144-1 to 144-X, and the plurality of host WSSs 147-1 and 147-2. In the example of FIG. 7, the WSSs 141-1 to 141-X are connected to the host WSS 147-1, and the AWGs 144-1 to 144-X are connected to the host WSS 147-2.

The configuration of FIG. 7 is different from the configuration of FIG. 6 in that targets to be controlled by the transfer wavelength control unit 143*a* are the WSSs 141 and 142 and the host WSS 147-1 and that the plurality of AWGs 144-1 to 144-X is newly provided instead of the plurality of WSSs 142-1 to 142-X. The WSSs 141 and the host WSSs 147 perform processing similar to that of the functional units having the same names of FIG. 6, and thus description thereof is omitted.

The AWG 144-*x* is connected to different nP/X optical transmission lines among the n optical transmission lines connected to the second ports of each optical SW 11 (nP optical transmission lines in total) and outputs an optical signal having the set wavelength output from the host WSS 147-2 via a path corresponding to the wavelength. The number of ports required for the AWG 144 is n×P/X.

The amplifier may be provided between any or all of the WSS 141-*x* and the host WSS 147-1, the host WSS 147-1 and the host WSS 147-2, and the AWG 144-*x* and the host WSS 147-2.

In the configuration of FIG. 6, the AWGs 144-1 to 144-X may be newly provided instead of the WSSs 141-1 to 141-X.

Next, another example will be described with reference to FIG. 8. FIG. 8 is a block diagram illustrating a specific example of a (third) functional configuration of the return transfer unit 14*a* according to the second embodiment.

The return transfer unit 14*a* includes the plurality of AWGs 144-1 to 144-X, a plurality of couplers 145-1 to 145-X, the amplifier 146, a plurality of amplifiers 148-1 to 148-X, a plurality of host couplers 149-1 to 149-2, and a plurality of amplifiers 150-1 to 150-X.

In the example of FIG. 8, a coupler 145-*x* is connected to the host coupler 149-1 via an amplifier 148-*x*, the AWG 144-*x* is connected to the host coupler 149-2 via an amplifier 150-*x*, and the host coupler 149-1 and the host coupler 149-2 are connected via the amplifier 146.

The coupler 145-*x* is connected to different nP/X optical transmission lines among the n optical transmission lines connected to the second ports of each optical SW 10 (nP optical transmission lines in total) and receives an optical signal transmitted via any of the nP/X optical transmission lines as an input. The coupler 145-*x* multiplexes the input optical signals and outputs the multiplexed optical signal.

The amplifier 148-*x* amplifies the optical signal output from the coupler 145-*x*.

The host coupler 149-1 multiplexes the optical signals amplified by the respective amplifiers 148 and outputs the multiplexed optical signal.

The host coupler 149-2 splits the optical signal output from the host coupler 149-1 and amplified by the amplifier 146.

The amplifier 150-*x* amplifies the optical signal output from the host coupler 149-2.

The AWG 144-*x* is connected to different nP/X optical transmission lines among the n optical transmission lines connected to the second ports of each optical SW 11 (nP optical transmission lines in total) and outputs the optical signal amplified by each amplifier 150 via a path corresponding to the wavelength. The number of ports required for the AWG 144-*x* is n×P/X.

Third Embodiment

A third embodiment is similar to the first embodiment in the system configuration of the optical communication system 1, except for the configuration of the return transfer unit 14. Therefore, hereinafter, differences from the first embodiment will be described.

Figure 9:
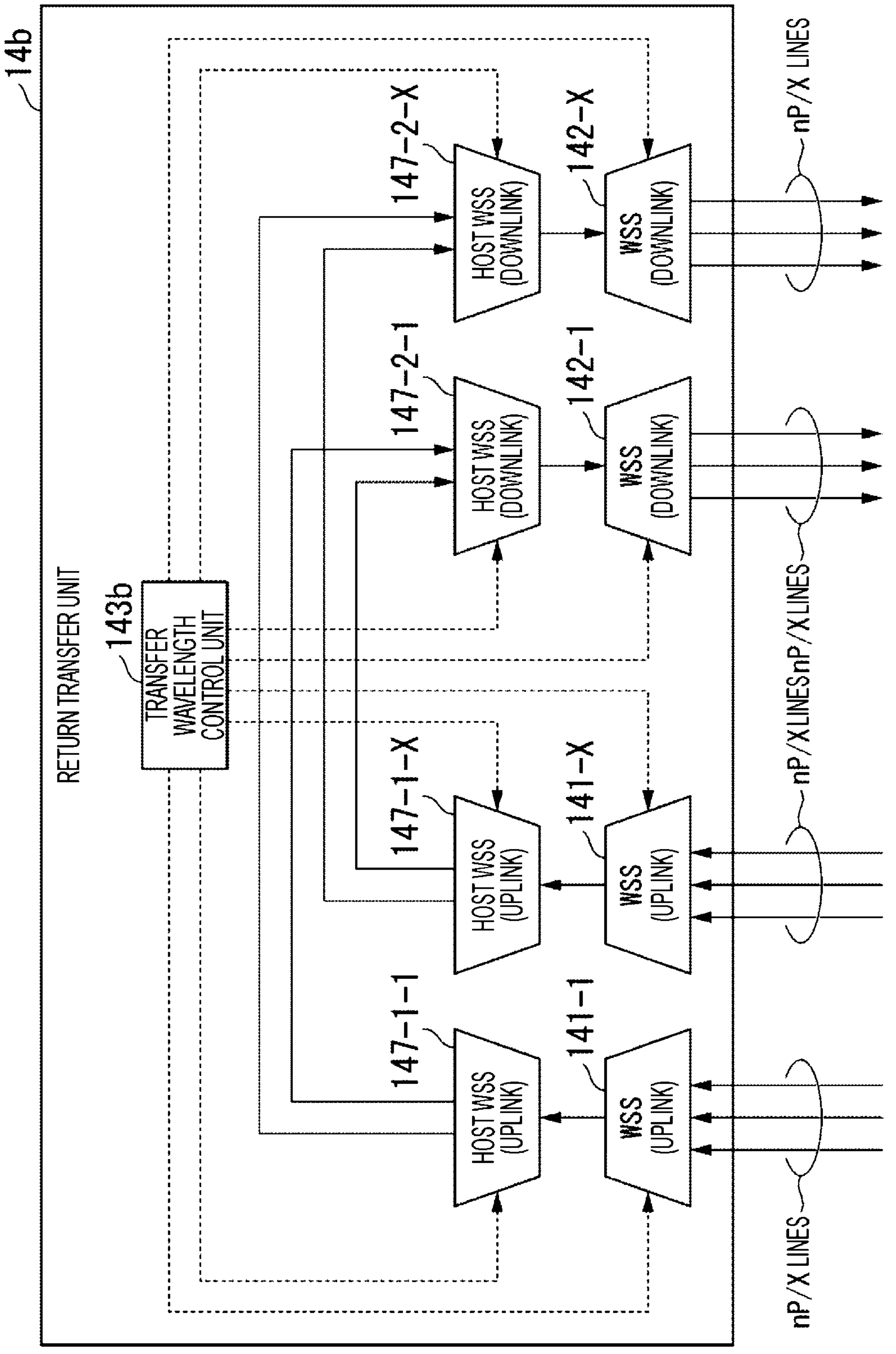
FIG. 9 is a block diagram illustrating a specific example of a (first) functional configuration of a return transfer unit according to a third embodiment.

FIG. 9 is a block diagram illustrating a specific example of a (first) functional configuration of a return transfer unit 14*b* according to the third embodiment.

The return transfer unit 14*b* includes the plurality of WSSs 141-1 to 141-X, the plurality of WSSs 142-1 to 142-X, a transfer wavelength control unit 143*b*, a plurality of host WSSs 147-1-1 to 147-1-X, and a plurality of host WSSs 147-2-1 to 147-2-X. In the example of FIG. 9, the WSS 141-*x* is connected to a host WSS 147-1-*x*, and the WSS 142-*x* is connected to a host WSS 147-2-*x*.

The WSS 141-*x* is connected to different nP/X optical transmission lines among the n optical transmission lines connected to the second ports of each optical SW 10 (nP optical transmission lines in total) and outputs, to the host WSS 147-1-*x*, an optical signal having the set wavelength among optical signals transmitted via a certain optical transmission line.

The WSS 142-*x* is connected to different nP/X optical transmission lines and outputs an optical signal having the set wavelength output from the host WSS 147-2-*x* to an optical transmission line serving as an output path of the set wavelength.

The host WSS 147-1-*x* outputs, to the host WSS 147-2, an optical signal having the set wavelength among optical signals output from the WSS 141-*x*.

The host WSS 147-2-*x* outputs, to the WSS 142-*x*, an optical signal having the set wavelength among optical signals output from the host WSS 147-1.

The transfer wavelength control unit 143*b* sets a wavelength to be output by the WSSs 141 and 142 and the host WSSs 147 in response to an instruction from the control unit 12. The transfer wavelength control unit 143*b* may be mounted on the control unit 12.

According to the optical communication system 1 of the third embodiment configured as described above, not only the X WSSs 141 and the X WSSs 142 but also the X host WSSs 147-1 and the X host WSSs 147-2 are also arranged in parallel. In the second embodiment, a maximum of nP wavelengths need to be aggregated in the host WSS 147. Meanwhile, in the third embodiment, the maximum number of wavelengths accommodated in each WSS is nP/X. This makes it possible to reduce the number of wavelengths to be accommodated in one WSS.

Modification Example of Third Embodiment

The amplifier may be provided between any or all of the WSS 141-*x* and the host WSS 147-1-*x*, the host WSS 147-1 and the host WSS 147-2, and the WSS 142-*x* and the host WSS 147-2-*x*.

Figure 10:
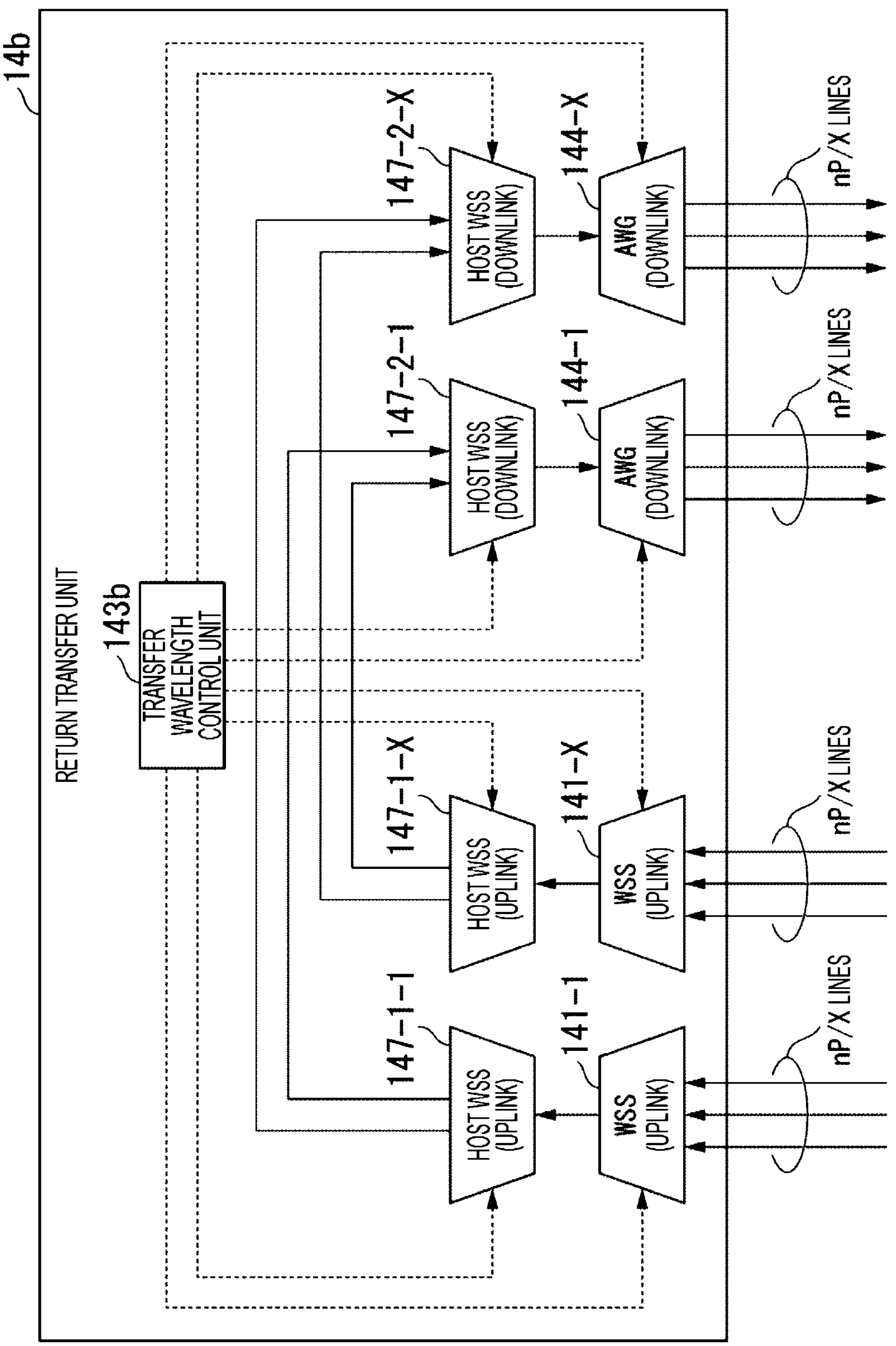
FIG. 10 is a block diagram illustrating a specific example of a (second) functional configuration of the return transfer unit according to the third embodiment.
Figure 11:
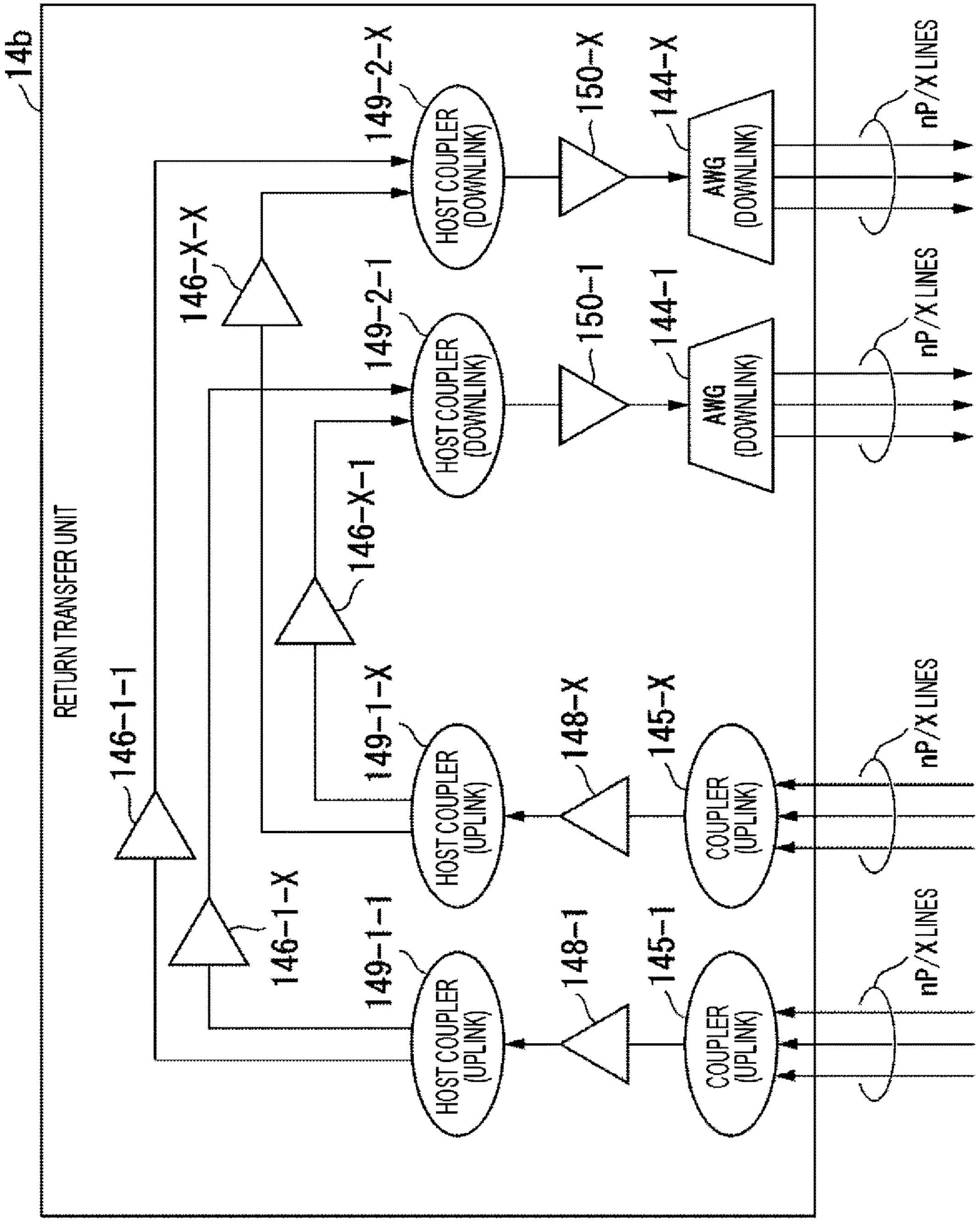
FIG. 11 is a block diagram illustrating a specific example of a (third) functional configuration of the return transfer unit according to the third embodiment.
Figure 12:
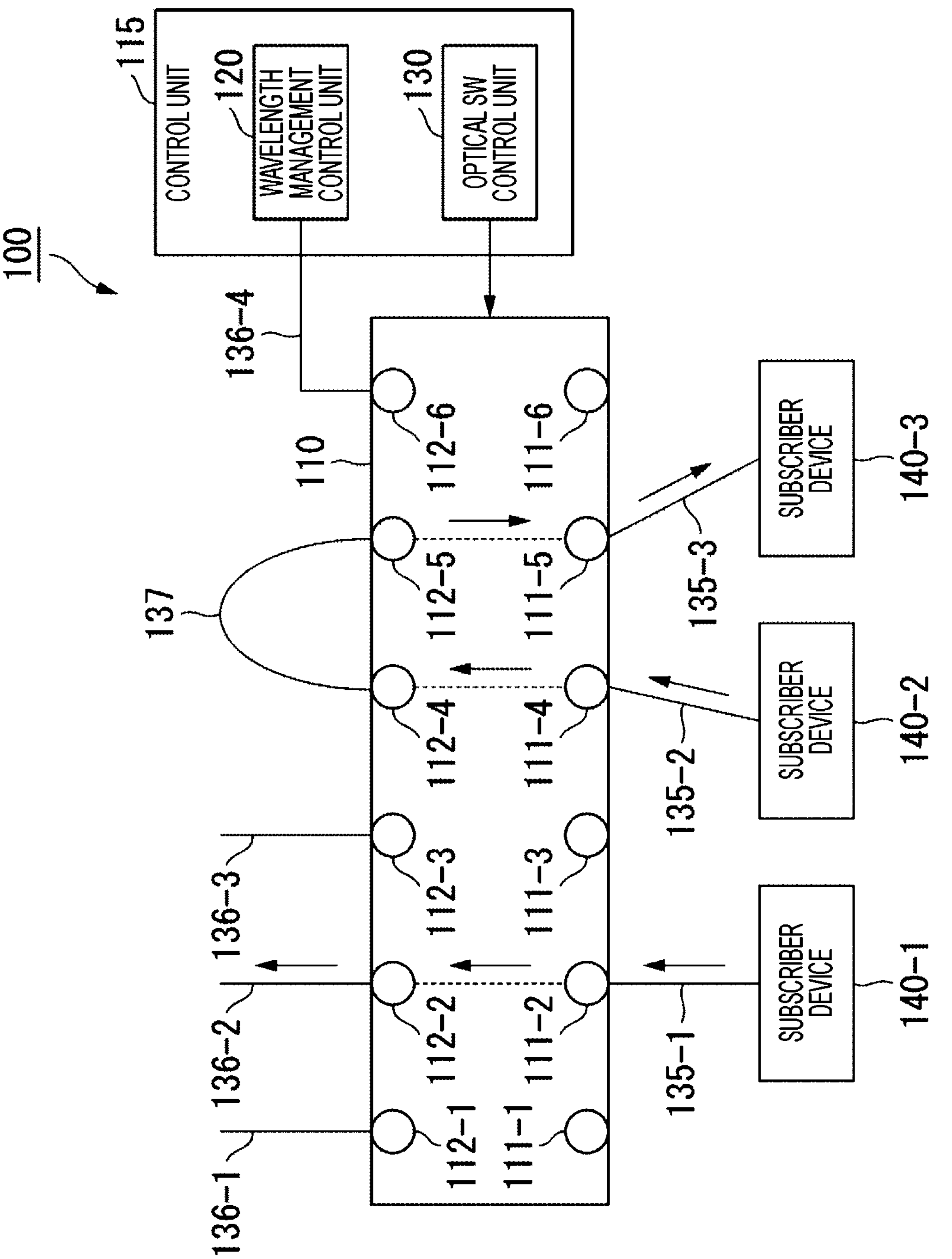
FIG. 12 illustrates a configuration example of an optical communication system including a conventional optical communication device.
Figure 13:
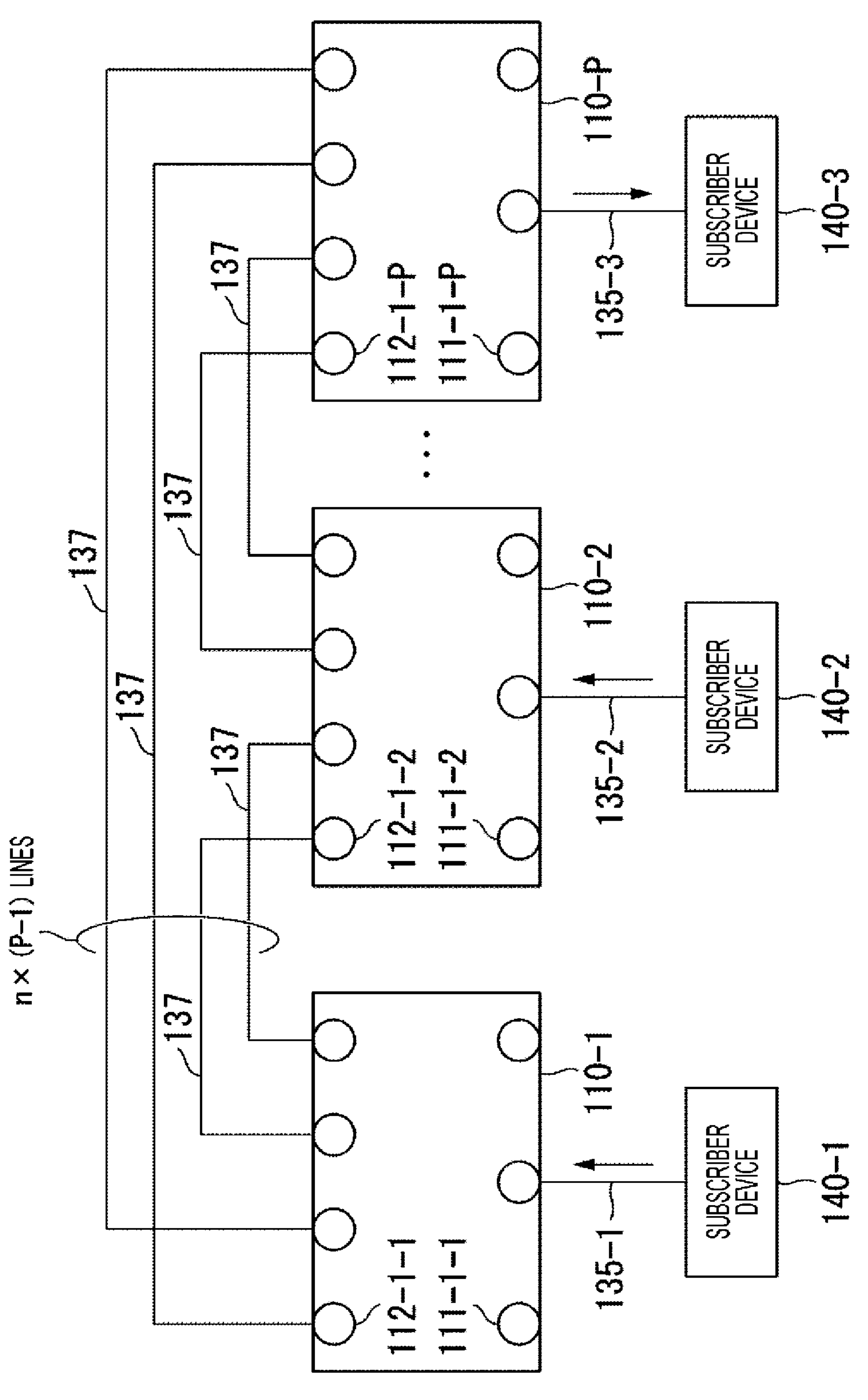
FIG. 13 is an explanatory diagram of a configuration in which a plurality of optical SWs is arranged in parallel.

The return transfer unit 14*b* may have a configuration of FIG. 10 or 11.

FIG. 10 is a block diagram illustrating a specific example of a (second) functional configuration of the return transfer unit 14*b* according to the third embodiment.

The return transfer unit 14*b* includes the plurality of WSSs 141-1 to 141-X, the transfer wavelength control unit 143*b*, the plurality of AWGs 144-1 to 144-X, the plurality of host WSSs 147-1-1 to 147-1-X, and the plurality of host WSSs 147-2-1 to 147-2-X.

In the example of FIG. 10, the WSS 141-*x* is connected to the host WSS 147-1-*x*, and the AWG 144-*x* is connected to the host WSS 147-2-*x*. The configuration of FIG. 10 is different from the configuration of FIG. 9 in that targets to be controlled by the transfer wavelength control unit 143*b* are the WSSs 141 and the host WSSs 147 and that the plurality of AWGs 144-1 to 144-X is newly provided instead of the plurality of WSSs 142-1 to 142-X. The WSSs 141 and the host WSSs 147 perform processing similar to that of the functional units having the same names of FIG. 9, and thus description thereof is omitted.

The AWG 144-*x* is connected to different nP/X optical transmission lines among the n optical transmission lines connected to the second ports of each optical SW 11 (nP optical transmission lines in total) and outputs an optical signal having the set wavelength output from the host WSS 147-2-*x* via a path corresponding to the wavelength. The number of ports required for the AWG 144-*x* is n×P/X.

The amplifier may be provided between any or all of the WSS 141-*x* and the host WSS 147-1-*x*, the host WSS 147-1 and the host WSS 147-2, and the AWG 144-*x* and the host WSS 147-2-*x*.

In the configuration of FIG. 9, the AWGs 144-1 to 144-X may be newly provided instead of the WSSs 141-1 to 141-X.

Next, another example will be described with reference to FIG. 11. FIG. 11 is a block diagram illustrating a specific example of a (third) functional configuration of the return transfer unit 14*b* according to the third embodiment.

The return transfer unit 14*b* includes the plurality of AWGs 144-1 to 144-X, the plurality of couplers 145-1 to 145-X, a plurality of amplifiers 146-1-1 to 146-X-X, the plurality of amplifiers 148-1 to 148-X, a plurality of host couplers 149-1-1 to 149-1-X, a plurality of host couplers 149-2-1 to 149-2-X, and the plurality of amplifiers 150-1 to 150-X.

In the example of FIG. 11, the coupler 145-*x* is connected to a host coupler 149-1-*x* via the amplifier 148-*x*, the AWG 144-*x* is connected to a host coupler 149-2-*x* via the amplifier 150-*x*, and the host couplers 149-1 and the host couplers 149-2 are connected via the amplifiers 146.

The coupler 145-*x* is connected to different nP/X optical transmission lines among the n optical transmission lines connected to the second ports of each optical SW 10 (nP optical transmission lines in total) and receives an optical signal transmitted via any of the nP/X optical transmission lines as an input. The coupler 145-*x* multiplexes the input optical signals and outputs the multiplexed optical signal.

The amplifier 148-*x* amplifies the optical signal output from the coupler 145-*x*.

The host coupler 149-1-*x* splits the optical signal amplified by the amplifier 148-*x* and outputs the split optical signals.

The host coupler 149-2-*x* multiplexes the optical signals output from the respective host couplers 149-1 and amplified by the connected amplifiers 146.

The amplifier 150-*x* amplifies the optical signal output from the host coupler 149-2-*x*.

The AWG 144-*x* is connected to different nP/X optical transmission lines among the n optical transmission lines connected to the second ports of each optical SW 11 (nP optical transmission lines in total) and outputs the optical signal amplified by the amplifier 150-*x* via a path corresponding to the wavelength. The number of ports required for the AWG 144-*x* is n×P/X.

Modification Examples of First to Third Embodiments

In each of the above embodiments, the optical SWs are separately used in the uplink direction and in the downlink direction, but the same optical SWs may be used in the uplink direction and in the downlink direction.

In each of the above embodiments, the configuration in which the optical SWs 10, the optical SWs 11, and the return transfer unit 14, 14*a*, or 14*b* are provided in one optical communication device has been described. Any one of the optical SWs 10, the optical SWs 11, and the return transfer unit 14, 14*a*, or 14*b* may be mounted on another device.

Some functional units (e.g. the control unit 12 and the return transfer unit 14, 14*a*, or 14*b*) included in the optical communication device in the above embodiments may be implemented by a computer. In that case, a program for implementing this function may be recorded in a computer-readable recording medium, and the program recorded in the recording medium may be read and executed by a computer system to implement the function. Note that the "computer system" herein includes an OS and hardware such as peripheral devices.

The "computer-readable recording medium" refers to a portable medium such as a flexible disk, a magneto-optical disc, a ROM, or a CD-ROM or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. The above program may be for implementing some of the functions described above, may implement the functions described above by a combination with a program already recorded in the computer system, or may be implemented by using a programmable logic device such as an FPGA.

As described above, the embodiments of the present invention have been described in detail with reference to the drawings. However, specific configurations are not limited to the embodiments and include design and the like within the scope of the present invention.

INDUSTRIAL APPLICABILITY

The present invention is applicable to an optical communication system technique that performs return communication via an optical SW.

REFERENCE SIGNS LIST

10-1 to 10-P, 11-1 to 11-P Optical SW
12 Control unit
121 Wavelength management control unit
122 Optical SW control unit
14, 14*a*, 14*b* Return transfer unit
16-1 to 16-3 Subscriber device
141, 141-1 to 141-X, 142, 142-1 to 142-X WSS
143, 143*a*, 143*b* Transfer wavelength control unit
144, 144-1 to 144-X AWG
145, 145-1 to 145-X Coupler
146, 146-1-1 to 146-X-X, 148-1 to 148-X, 150-1 to 150-X Amplifier
147-1, 147-2, 147-1-1 to 147-1-X, 147-2-1 to 147-2-X Host WSS
149-1, 149-2, 149-1-1 to 149-1-X, 149-2-1 to 149-2-X Host coupler

The invention claimed is:

1. An optical communication device comprising:

a first optical switch configured to include a plurality of first ports and a plurality of second ports, and output an optical signal input from any of the plurality of first ports from any of the plurality of second ports;

a second optical switch configured to include a plurality of first ports and a plurality of second ports, and output the optical signal input from any of the plurality of second ports from any of the plurality of first ports; and a return transferer configured to transfer the optical signal output from any of the plurality of second ports of the first optical switch by returning the optical signal to any of the plurality of second ports of the second optical switch, some of the plurality of second ports of the first optical switch are connected to the return transferer, while a remaining second ports of the first optical switch are connected to another device, and some of the plurality of second ports of the second optical switch are connected to the return transferer, while a remaining second ports of the second optical switch are connected to another device, wherein the return transferer comprises a first wavelength selective optical switch and a second wavelength selective optical switch, wherein the first wavelength selective optical switch is configured to output an optical signal having a wavelength set among the optical signal output from any of the plurality of second ports of the first optical switch, wherein the second wavelength selective optical switch is configured to output an optical signal having a wavelength set among the optical signal output from the first wavelength selective optical switch to any of the plurality of second ports of the second optical switch.

2. The optical communication device according to claim 1, communication between subscriber devices connected under the optical communication device is performed via return communication using a second port connected to the transferer among the plurality of second ports of the first optical switch and a second port connected to the transferer among the plurality of second ports of the second optical switch.

3. The optical communication device according to claim 2, wherein the first optical switch and the second optical switch are different optical switches or same optical switch.

4. The optical communication device according to claim 3, wherein the plurality of first ports of the first optical switch and the plurality of first ports of the second optical switch is connected to different subscriber devices via optical transmission lines.

5. The optical communication device according to claim 2, wherein the plurality of first ports of the first optical switch and the plurality of first ports of the second optical switch is connected to different subscriber devices via optical transmission lines.

6. The optical communication device according to claim 1, wherein the first optical switch and the second optical switch are different optical switches or same optical switch.

7. The optical communication device according to claim 6, wherein the plurality of first ports of the first optical switch and the plurality of first ports of the second optical switch is connected to different subscriber devices via optical transmission lines.

8. The optical communication device according to claim 1, wherein the plurality of first ports of the first optical switch and the plurality of first ports of the second optical switch is connected to different subscriber devices via optical transmission lines.

9. The optical communication device according to claim 1, wherein the first optical switch and the second optical switch are N×M switches (where N and M are integers greater than or equal to 2).

10. An optical communication system comprising:

an optical communication device; and a controller, wherein the optical communication device includes:

a first optical switch configured to include a plurality of first ports and a plurality of second ports, and output an optical signal input from any of the plurality of first ports from any of the plurality of second ports;

a second optical switch configured to include a plurality of first ports and a plurality of second ports, and output the optical signal input from any of the plurality of second ports from any of the plurality of first port; and a return transferer configured to transfer the optical signal output from any of the plurality of second ports of the first optical switch by returning the optical signal to any of the plurality of second ports of the second optical switch, when transferring, wherein the controller is configured to control to connect any of the plurality of second ports of the first optical switch to the return transferer in order to transfer an optical signal transmitted from a source subscriber device, and to connect any of the plurality of second ports of the second optical switch to which the optical signal is to be transferred to the return transferer, some of the plurality of second ports of the first optical switch are connected to the return transferer, while a remaining second ports of the first optical switch are connected to another device, and some of the plurality of second ports of the second optical switch are connected to the return transferer, while a remaining second ports of the second optical switch are connected to another device, wherein the return transferer comprises a first wavelength selective optical switch and a second wavelength selective optical switch, wherein the first wavelength selective optical switch is configured to output an optical signal having a wavelength set among the optical signal output from any of the plurality of second ports of the first optical switch, wherein the second wavelength selective optical switch is configured to output an optical signal having a wavelength set among the optical signal output from the first wavelength selective optical switch to any of the plurality of second ports of the second optical switch.

11. The optical communication system according to claim 10, wherein:

the controller is configured to switch the connections between the plurality of first ports and the plurality of second ports of the first optical switch, and the connections between the plurality of first ports and the plurality of second ports of the second optical switch, so as to enable communication between a subscriber device connected to the first optical switch and a subscriber device connected to the second optical switch.

12. A transfer method comprising:

a first optical switch includes a plurality of first ports and a plurality of second ports, and a second optical switch includes a plurality of first ports and a plurality of second ports, outputting, by the first optical switch, an optical signal input from any of the plurality of first ports from any of the plurality of second ports, transferring, by a return transferer, the optical signal output from any of the plurality of second ports of the first optical switch by returning the optical signal to any of the plurality of second ports of the second optical switch, outputting, by the second optical switch, the optical signal input from any of the plurality of second ports from any of the plurality of first ports, some of the plurality of second ports of the first optical switch are connected to the return transferer, while a remaining second ports of the first optical switch are connected to another device, and some of the plurality of second ports of the second optical switch are connected to the return transferer, while a remaining second ports of the second optical switch are connected to another device, wherein the return transferer comprises a first wavelength selective optical switch and a second wavelength selective optical switch, outputting, by the first wavelength selective optical switch, an optical signal having a wavelength set among the optical signal output from any of the plurality of second ports of the first optical switch, outputting, by the second wavelength selective optical switch, an optical signal having a wavelength set among the optical signal output from the first wavelength selective optical switch to any of the plurality of second ports of the second optical switch.

* * * * *